United States Patent [19]

Adams et al.

[11] 4,291,202
[45] Sep. 22, 1981

[54] TELEPHONE HANDSET CHASSIS AND FLEXIBLE PRINTED CIRCUIT

[75] Inventors: William J. Adams, Franklin; William F. Wernet, Nashville; Steve W. Haskins, Laverne, all of Tenn.

[73] Assignee: Northern Telecom, Inc., Ottawa, Canada

[21] Appl. No.: 78,693

[22] Filed: Sep. 25, 1979

[51] Int. Cl.³ .................... H04M 1/03; H04M 1/23
[52] U.S. Cl. .................... 179/103; 179/90 K; 179/100 R; 179/178
[58] Field of Search ............ 179/90 K, 100 R, 100 D, 179/100 L, 103, 178, 179; 361/398

[56] References Cited

U.S. PATENT DOCUMENTS 3,627,930  12/1971  Tolman .................... 179/100 R
4,124,785  11/1978  Seretny et al. .................... 179/103

FOREIGN PATENT DOCUMENTS 7901067  8/1979  Netherlands .................... 179/103

Primary Examiner—John H. Wolff
Assistant Examiner—Randall P. Myers
Attorney, Agent, or Firm—Schwartz, Jeffery, Schwaab, Mack, Blumenthal & Koch

[57] ABSTRACT

For a telephone handset, a rigid chassis is provided, of elongate form with positions at each end for mounting respectively a receiver and a transmitter and an intermediate position for a pushbutton dial. A flexible circuit member carries the majority of the various components for the handset. The flexible circuit is elongated and extends along the back of the chassis, down through a slot and back along the front of the chassis, with the pushbutton dial assembly attached to the flexible circuit member. The majority of the items such as electronic components, recall button, line cord jack and other components can be preassembled to the flexible circuit member which is then assembled to the chassis, followed by attachment of the pushbutton dial assembly.

18 Claims, 9 Drawing Figures

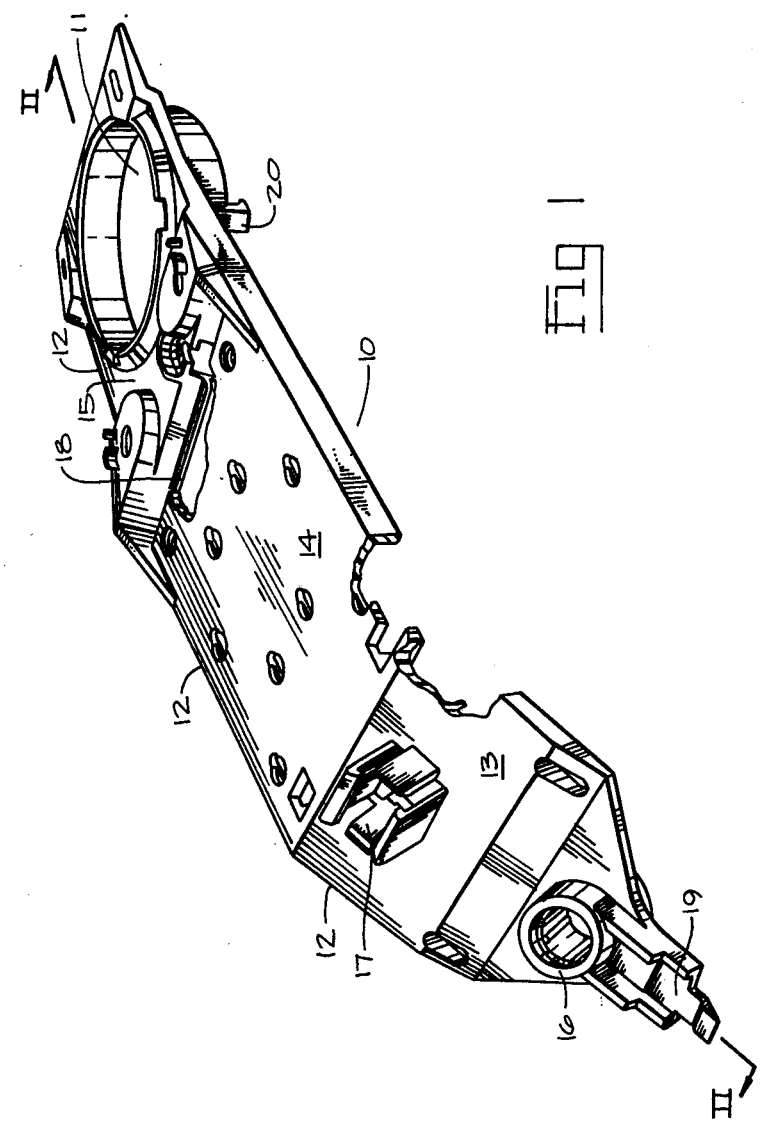

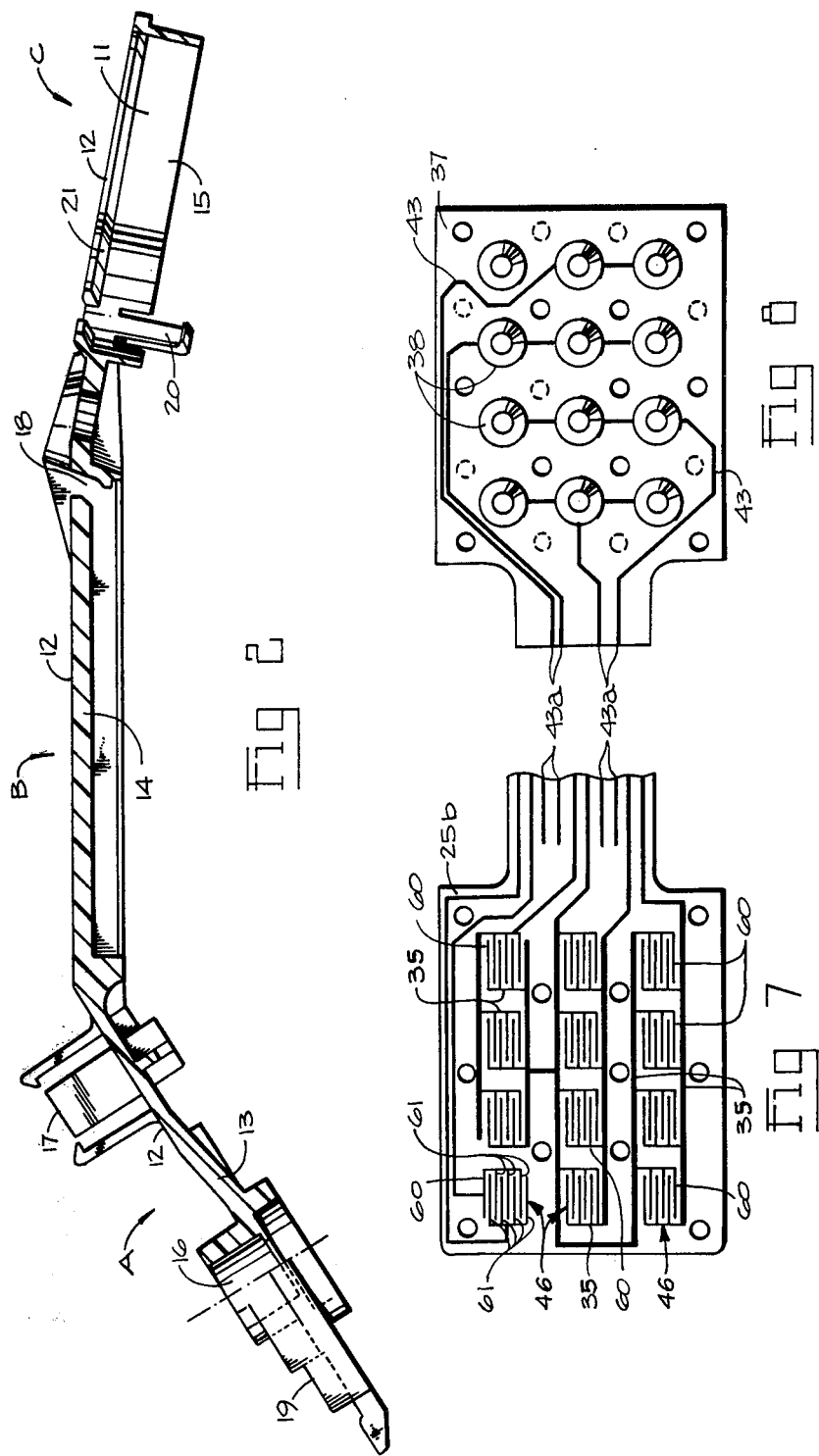

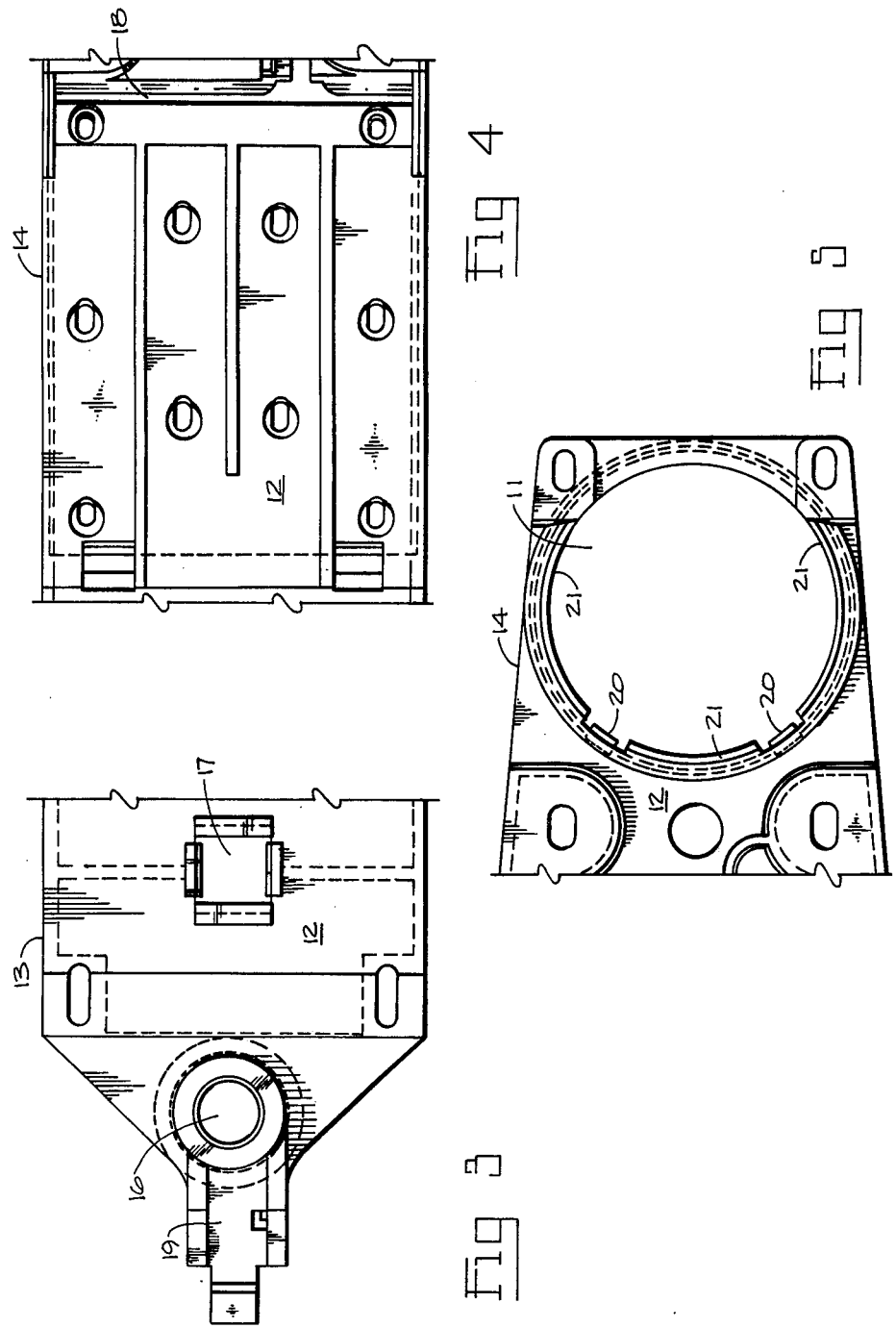

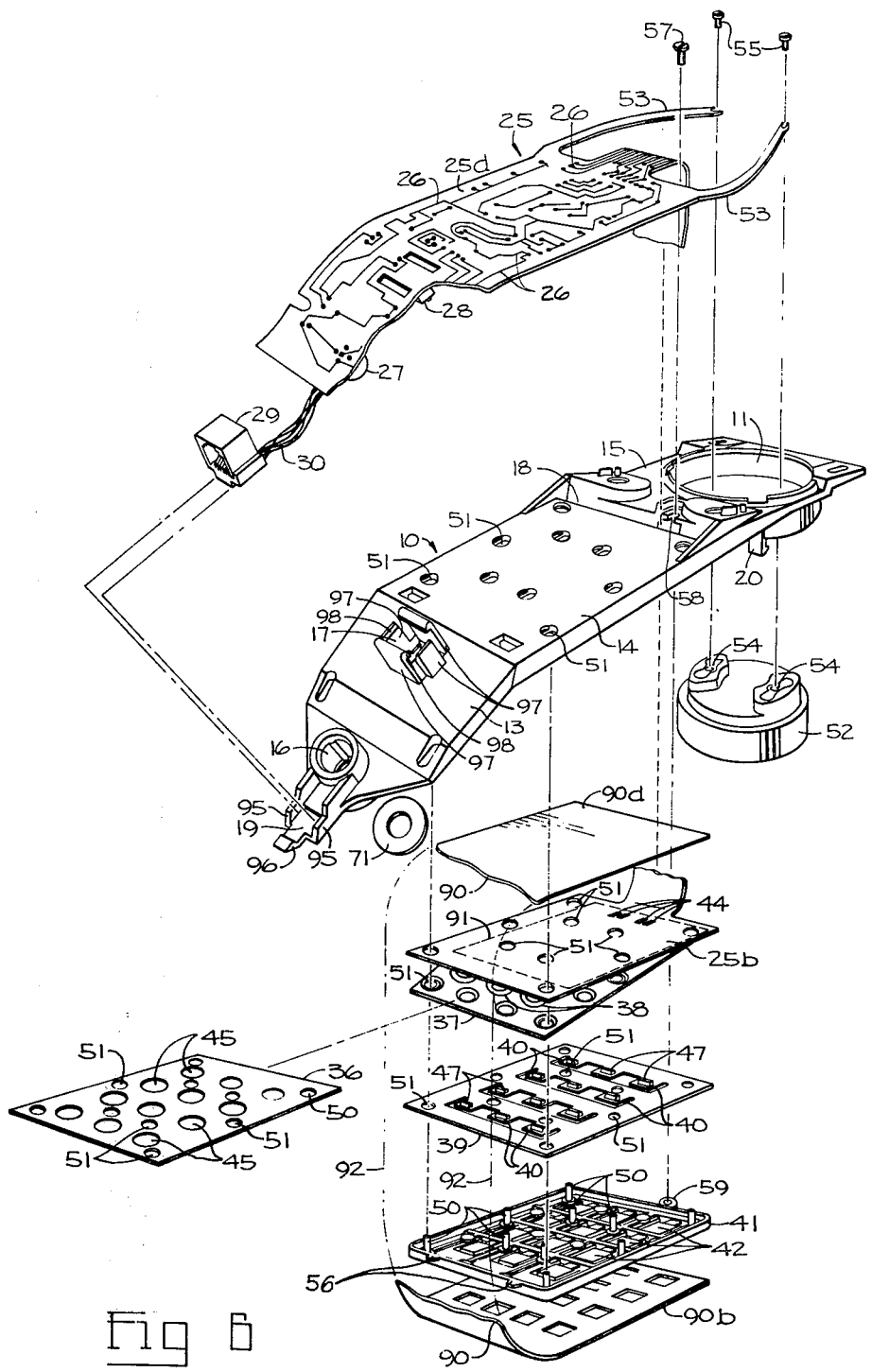

TELEPHONE HANDSET CHASSIS AND FLEXIBLE PRINTED CIRCUIT

BACKGROUND OF THE INVENTION

This invention relates to a telephone handset chassis and a flexible printed circuit mounted on the chassis.

In many forms of telephone handset, the various items such as receivers and, transmitters are mounted on a housing forming part of the handset, and then hard wired, that is connected by individual conductors attached by hand. Pushbutton dials are also mounted in handsets and again these are often first assembled to a housing or other part and then hard wired. In such arrangements, there is usually provided an assembly line along which the housing or other member passes, with different items being assembled to the housing or member at various stations. Particularly with handsets with pushbutton dials, or other forms of dial, considerable wiring has to be carried out at the assembly stage. While it is known to provide a chassis onto which the various items are assembled, the assembly then being positioned in the handset, wiring of the items on the chassis is still necessary.

SUMMARY OF THE INVENTION

The present invention provides a sub-assembly for a telephone handset in which the interconnections are made by a flexible printed circuit, and in which certain items are preassembled to the flexible circuit member. At least some of these items, which are assembled on to the flexible circuit member, snap into position on the chassis while other items are first snapped into position and then parts of the flexible circuit are connected to these items. The flexible circuit member carries the pushbutton dial assembly and the flexible circuit member passes through the chassis with the part carrying the dial being on one side, for example, the front side of the chassis, while the other part of the circuit being on the other side, for example the rear side.

Thus the invention comprises a rigid chassis of generally flat elongate form having positions at each end for mounting a receiver and a transmitter and an intermediate position for a pushbutton dial, and a flexible circuit member carrying at least some of the items for the handset, the flexible circuit member being elongate and forming part of a pushbutton dial assembly at one end, the one end passing down through the chassis at a position intermediate its ends, the flexible circuit member folded back against a front side of the chassis for the pushbutton dial assembly to attach to the chassis, the rest of the flexible circuit member positioned against the rear side of the chassis with items mounted on the flexible circuit snapping into retaining positions on the chassis. Additional items can be mounted on the chassis and extensions of the flexible circuit connected to the additional items.

BRIEF DESCRIPTION OF THE DRAWINGS

The invention will be readily understood by the following description of an embodiment, by way of example, in conjunction with the accompanying drawings, in which:

FIG. 1 is a perspective view on the back side of a chassis;

FIG. 2 is a longitudinal cross-section on the line II—II of FIG. 1;

FIGS. 3, 4 and 5 are views on the back sides of the three sections of the chassis, in the directions of arrows A, B and C, respectively, in FIG. 2;

FIG. 6 is an exploded perspective view of a chassis, flexible circuit member, pushbutton dial assembly and receiver;

FIG. 7 is a view on the front surface of part of the flexible circuit member, showing the circuit for the pushbutton switches;

FIG. 8 is a view on the contact surface of the contact member; and

DETAILED DESCRIPTION OF THE PREFERRED EMBODIMENTS

Figure 9:
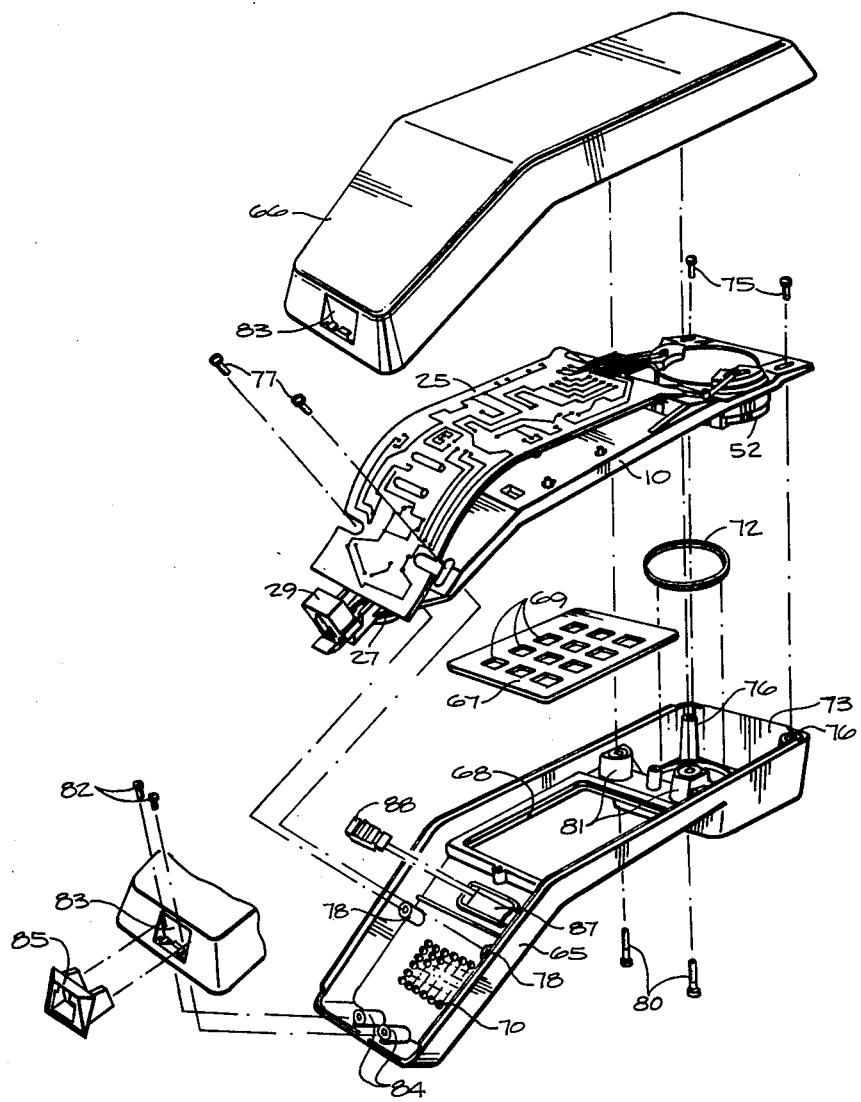
FIG. 9 is an exploded perspective view of assembled chassis and flexible circuit member and the front and back housings of the handset.

As illustrated in FIG. 1, a chassis 10 is in the form of an elongate flat member, generally of molded plastic material, and having a mounting position 11 at one end for reception of a transmitter, not shown in FIG. 1. As illustrated in FIG. 1, the back side 12 of the chassis is uppermost. The chassis has three sections 13, 14 and 15, end section 13 at one end having a mounting position 16 for a receiver, in the present example an electret receiver, and a clip-in position 17 for a recall switch. End section 15 at the other end contains the mounting position 11, in the form of an aperture, for the transmitter. The intermediate or central section 14 is adapted for mounting of the pushbutton switch or dial assembly. In the example, the receiver and recall switch are mounted from the rear side of the chassis, the transmitter is entered from the front side, and clips in, and the pushbutton dial also mounts on the front side. A transverse slot 18 extends through the chassis at one end of the center section 14, adjacent to the end section 15. Section 13 also has an extension 19 on which is mounted a jack, not shown in FIG. 1, for reception of the plug on the end of the handset cord.

FIG. 2 illustrates the relative inclinations of the sections 13, 14 and 15. The sections are inclined to give the overall arcuate effect as required by the handset to suit the facial characteristics of a user. Making the three sections as three somewhat planar sections is more convenient for manufacturing purposes, but sections 13 and 15 could be arcuate if desired. Also seen are the positions 11, 16, 17 and 19. FIGS. 3, 4 and 5 show the back sides 12 of the various sections of the chassis. Also seen in FIGS. 1 and 2 are resilient members 20 which retain the transmitter in position. Two members 20 are provided, at the positions indicated in FIG. 5. The members deflect outwards as the transmitter is pushed into the aperture at 11 and engage over the front edge of the transmitter. The rear of the transmitter abuts a radially inward extending rim 21 on the back side of section 14. Various holes are provided through the chassis for assembly to the handset housings, as will be seen in FIGS. 6 and 9.

FIG. 6 shows the various components which form an assembled chassis. A flexible circuit member 25 is shown, which comprises two main parts, part 25a which carries the circuit 26 on a back surface for various electronic components, not seen, mounted on a front surface, and also has mounted thereon the receiver 27 and the recall button 28. The electronic components, receiver and recall button are mounted on the front surface of part 25a and can be flow soldered to the circuit 26. Also attached and connected to part 25a is jack 29 for the handset cord plug (not shown), the jack, in the present example, being connected via conductors 30, although by suitably redesigning the jack 29, this could be mounted on an extension of the part 25a.

Part 25a generally overlies the back side of the central section 14 of the chassis 10. The flexible circuit member, which is reduced in width at 31, passes down through the slot 18 to part 25b of the circuit member. The back surface of part 25b is seen in FIG. 6, but on the front surface is formed the circuit for the pushbuttons. This circuit is seen in FIG. 7 at 35. The pushbutton assembly comprises the part 25b of the flexible circuit member, an insulating spacer member 36, a thin plastic contact member 37 having a plurality of deformable domed contact portions 38, a thin flexible member 39 having a plurality of flexible cantilever members 40 and a bezel member 41 having a plurality of cantilevered buttons 42. As illustrated in FIG. 8, the contact portions 38 are metallized and connected via circuit pattern 43. The contact member 37 is attached to the flexible circuit member by staking through overlapping circuit portions, indicated at 43a in FIGS. 7 and 8, the staking indicated at 44 in FIG. 6.

The spacer member 36 has a plurality of holes 45, each corresponding to a button position and aligned with a contact area 46 on the circuit 35. The domed portions 38 on the member 37 are aligned with the holes 45. The member 37 is for example, of a thin plastic material, such as mylar, having the conductive metal contact portions on the surface which is brought into contact with the circuit 35. Similarly, the cantilever members 40 are aligned with the domed portions 38 and are provided with protrusions 47 which contact the domed portions 38. The buttons 42 are aligned with the cantilevered members 40 and the arrangement is such that pressure on the front surface of a button 42 pushes down the related cantilevered member 40 with protrusion 47 deforming the related domed portion 38 into contact with the related contact area 46. The bezel member 41 has a number of pin portions 50 extending from the rear surface, the pin portions extending through associated holes 51 in the members 39, 37, 36, part 25b and section 14.

Also seen in FIG. 6 is the transmitter 52. The transmitter is pushed up into the position 11, deflecting the resilient members 20. Once the transmitter is in position, with its back surface against the rim 21, the members 20 engage over the front of the transmitter and retain it in place. Two flexible extensions 53 extend from the part 25a of the flexible printed circuit member 25 and connect to the terminals 54 on the transmitter by screws 55. Circuits are also printed on the undersurface of part 25a of the flexible circuit member 25, in addition to the circuit 26 seen in FIG. 6, and conductive paths extend along the extensions 53. The bezel is held in position by two projections 56 at one end which slide into recesses in the center section of the chassis and by a screw 57 which passes through a slot 58 in the chassis and into a boss 59 at the end of the bezel remote from the projections 56. This holds the whole pushbutton assembly up against the front side of the chassis 10, the pins 50 passing through the holes 51 in the chassis.

FIG. 7 illustrates the circuit pattern on the part 25b. The circuit pattern defines a plurality of switch positions 60 each having a plurality of contact members 61. On depression of a button 40, with deformation of a domed portion 38, the contact members 61 at a particular switch position are interconnected by the metallized contact portions 38 on the member 37.

FIG. 9 illustrates a handset, with front and back housings 65 and 66 and an assembled chassis and flexible printed circuit member 10 and 25. There is also provided a mask member 67 which is positioned in an opening 68 in the front housing 65; the mask having a plurality of openings 69 which are aligned with the buttons 42. A perforated area 70 is provided at the receiver position and a sealing washer 71 (FIG. 6) is positioned between the chassis and the housing at this position. Also a sealing ring 72 is positioned between the front face of the transmitter 52 and the housing 65. The transmitter sits in a cup-shaped portion 73 of the housing 65, and the cup-shaped portion has a perforated base, not seen.

The chassis assembly is held in the front housing by screws 75 screwing into bosses 76 at the transmitter end and by two further screws 77 screwing into bosses 78 adjacent to the receiver position. The back housing attaches to the front housing by screws 80 passing through bosses 81 in the front housing between the aperture 68 and the cup-shaped portion 73 and screwing into bosses (not shown) in the back housing. Two further screws 82 are inserted through holes in a recess 83 at the receiver end of the back housing and screw into bosses 84 at the end of the front housing. After insertion of the screws 82, an insert 85 is pushed into the recess 83 and snaps into position. The insert 85 has an aperture 86 aligned with the jack 29. An opening 87 has a push-member 88 positioned therein, the member 88 in contact with the recall button 27. Pressure on the member 88 actuates the recall button 27.

A problem can arise with electronic telephones, with solid state and semiconductor devices in that if a static electrical charge builds up on a user, as can happen for example in an office or a home with synthetic material carpeting, then on the user touching a press-button the charge can be discharged into the circuit with possible damage to the components. To avoid this, or at least reduce the effects to a substantially harmless level, it is possible to provide for the grounding of any charge. One way of providing such grounding is illustrated in FIG. 6. A strip of, for example, aluminum foil 90 has one end 90a, interposed between the back surface of part 25b of the flexible circuit member and the frontside of the chassis. A ground circuit pattern, typically indicated by dotted lines 91, is provided on the back surface of part 25b. The strip 90 is folded over, as indicated by dotted lines 92, and the other end 90b extends over the front face of the bezel member 41 and has a plurality of apertures 93 which fit over protruding portions of the buttons 42. The ground circuit pattern 91 is connected to ground via a suitable part of the circuit pattern on the flexible circuit member 25.

The jack 29 is held in place in the extension 19 by a small protrusion on one of the walls 95 which enters a groove formed in one side of the base of the jack. The jack is slid in from the end, the protrusion entering the groove and the jack snaps down behind the lip 96. The attachment is only to hold the jack in place until the handset is assembled. The receiver 27 is, in the example illustrated, a push fit with the mounting position 16 and the recall button is snapped-in at position 17, four resilient members 97 being pushed apart slightly as the recall button is pushed and returning to their original position when the button is in place. Inwardly extending ribs 98 on the ends of members 97 retain the recall button in place.

What is claimed is:

1. Apparatus for use in a telephone handset, comprising:
   a rigid chassis of elongate form and including a transmitter mounting position at a first end, a receiver mounting position at a second end and a pushbutton dial position intermediate said ends, and a transverse slot through said chassis positioned between said dial position and said transmitter mounting position;
   a flexible printed circuit member including a first portion extending from said receiver mounting position along a back surface of said chassis to said slot, said printed circuit member extending through said slot and including a second portion extending back over a front surface of said chassis, said second portion extending over said front surface having a pushbutton switch circuit thereon;
   a pushbutton dial assembly mounted on said front surface of said chassis over said pushbutton switch circuit of said circuit member, at said dial position;
   a receiver mounted on said circuit member and attached to said chassis at said receiver mounting position; and
   a transmitter mounted at said transmitter mounting position.

2. An apparatus as claimed in claim 1, said flexible printed circuit member including extensions electrically connected to said transmitter.

3. An apparatus as claimed in claim 1, including a recall switch mounted on the first portion of said flexible printed circuit member and a mounting position on said chassis between said receiver position and said dial position, said recall button extending through said chassis.

4. An apparatus as claimed in claim 1, including a handset cord jack mounted on said chassis as said first end.

5. An apparatus as claimed in claim 1, including resilient members extending from said chassis at said transmitter mounting position, for retention of said transmitter in said position.

6. An apparatus as claimed in claim 1, said flexible printed circuit member having a back surface and a front surface, a printed circuit on said back surface and said receiver mounted on said front surface and connected to said circuit on said back surface.

7. An apparatus as claimed in claim 6, including electronic components mounted on said front surface and connected to said circuit on said back surface.

8. An apparatus as claimed in claim 1, said chassis having three sections, a central section and two end sections, one at each end of the central section, said end sections inclined relative to the central section at obtuse angles, to give an effective arcuate form to suit a handset configuration.

9. An apparatus as claimed in claim 8, including an aperture through one end section to form the transmitter mounting position.

10. An apparatus as claimed in claim 8, said mounting position for said receiver comprising an aperture through an end section remote from the end section having said transmitter mounting position.

11. An apparatus as claimed in claim 8, said pushbutton dial position being on said central section.

12. An apparatus as claimed in claim 1, wherein said pushbutton dial assembly comprises:
   a plurality of contact areas on said printed circuit member; and
   a thin plastic contact member having a plurality of deformable domed conductive contact portions positioned over said contact areas.

13. An apparatus as claimed in claim 12, wherein said dial assembly is a flexible dial assembly comprising a bezel member having a plurality of cantilevered buttons positioned over said domed contact portions.

14. An apparatus as claimed in claim 13, wherein said dial assembly further comprises a thin flexible member interposed between said bezel member and said contact member, said thin flexible member having a plurality of cantilever members positioned between said buttons and said domed contact portions such that when one of said buttons is depressed, a cantilever member depresses a domed contact portion which contacts a contact area to complete a circuit.

15. A telephone handset comprising:
   a front housing and a back housing, said front and back housings being assembled to form an enclosure;
   a rigid chassis in said enclosure, said chassis of elongate form and including a transmitter mounting position at a first end, a receiver mounting position at a second end and a pushbutton dial position intermediate said ends, and a transverse slot through said chassis positioned between said dial position and said transmitter mounting position;
   a flexible printed circuit member extending from said receiver mounting position along a back surface of said chassis to said slot, said printed circuit member extending through said slot and including a portion extending back over a front surface of said chassis, said portion over said front surface having a pushbutton switch circuit thereon;
   a pushbutton dial assembly mounted on said front surface of said chassis over said pushbutton switch circuit of said circuit member, at said dial position;
   a receiver mounted on said circuit member and attached to said chassis at said receiver mounting position; and
   a transmitter mounted at said transmitter mounting position.

16. A telephone handset as claimed in claim 15, including extensions on said flexible printed circuit member extending to and electrically connected to said transmitter, and a recall button mounted on said flexible circuit member at said back surface of and said chassis and extending through said chassis.

17. A telephone handset as claimed in claim 15, said flexible printed circuit member having a back surface and a front surface, a printed circuit on said back surface, said receiver mounted on said front surface and connected to said circuit on said back surface, and electronic components mounted on said front surface and connected to said circuit on said back surface.

18. A telephone handset as claimed in claim 15, said chassis having three sections, a central section and two end sections, one at each end of the central section, said end sections inclined relative to the central section at obtuse angles, to give an effective arcuate form to suit a handset configuration, an aperture through one end section to form the transmitter mounting position, said mounting position for said receiver comprising an aperture through an end section remote from the end section having said transmitter mounting position, and said pushbutton dial position being on said central section.

* * * * *

UNITED STATES PATENT AND TRADEMARK OFFICE
CERTIFICATE OF CORRECTION

PATENT NO. : 4,291,202
DATED : Sept. 22, 1981
INVENTOR(S) : William J. Adams et al.

It is certified that error appears in the above—identified patent and that said Letters Patent is hereby corrected as shown below:

On the Title Page, Item [73], "Northern Telecom, Inc., Ottawa, Canada" should read --- Northern Telecom, Inc. ---.

Signed and Sealed this

Twenty-third Day of February 1982

[SEAL]

Attest:

GERALD J. MOSSINGHOFF

Attesting Officer          Commissioner of Patents and Trademarks